US006052760A

United States Patent [19]
Bauman et al.

[11] Patent Number: 6,052,760
[45] Date of Patent: Apr. 18, 2000

[54] COMPUTER SYSTEM INCLUDING PLURAL CACHES AND UTILIZING ACCESS HISTORY OR PATTERNS TO DETERMINE DATA OWNERSHIP FOR EFFICIENT HANDLING OF SOFTWARE LOCKS

[75] Inventors: Mitchell A. Bauman, Circle Pines, Minn.; Arthur J. Nilson, Phoenixville; Douglas E. Morrissey, Allentown, both of Pa.

[73] Assignee: Unisys Corporation, Blue Bell, Pa.

[21] Appl. No.: 08/964,626

[22] Filed: Nov. 5, 1997

[51] Int. Cl.[7] .................................................. G06F 13/00
[52] U.S. Cl. .......................... 711/119; 711/141; 711/145; 711/147; 711/122
[58] Field of Search .................................... 711/141, 144, 711/145, 146, 147, 148, 117, 119, 122, 133, 137

[56] References Cited

U.S. PATENT DOCUMENTS

| | | | |
|---|---|---|---|
| 3,641,505 | 2/1972 | Artz et al. | 340/172.5 |
| 3,768,074 | 10/1973 | Sharp et al. | 340/172.5 |
| 3,812,469 | 5/1974 | Hauck et al. | 340/172.5 |
| 4,000,485 | 12/1976 | Barlow et al. | 340/172.5 |
| 4,240,143 | 12/1980 | Besemer et al. | 364/200 |
| 4,245,306 | 1/1981 | Besemer et al. | 364/200 |
| 4,253,144 | 2/1981 | Bellamy et al. | 364/200 |
| 4,253,146 | 2/1981 | Bellamy et al. | 364/200 |
| 4,392,196 | 7/1983 | Glenn et al. | 364/200 |
| 4,441,155 | 4/1984 | Fletcher et al. | 364/200 |
| 4,464,717 | 8/1984 | Keeley et al. | 364/200 |
| 4,466,059 | 8/1984 | Bastian et al. | 364/200 |

(List continued on next page.)

FOREIGN PATENT DOCUMENTS

| | | |
|---|---|---|
| 0 752 667 | 1/1997 | European Pat. Off. . |
| WO 95/25306 | 9/1995 | WIPO . |
| 96/35172 | 11/1996 | WIPO . |

OTHER PUBLICATIONS

Fred R. Goldstein, "Congestion Control in Frame Relay Networks Using Explicit Binary Feedback," Conference Proceedings, Mar. 27–20, 1991, pp. 558–564, Phoenix Conference on Computers and Communications.

Burroughs Corporation, "B6800" Multiprocessor Systems, Aug. 21, 1979, B 6000 Series System Notes, Mark III.1 Release, Sep. 1979, pp. 53–84.

Stenstrom, et al., "Boosting the Performance of Shared Memory Multiprocessors," Computer, Jul. 1997, pp. 63–70.

(List continued on next page.)

*Primary Examiner*—Glenn Gossage
*Attorney, Agent, or Firm*—Steven B. Samuels; Mark T. Starr; Sterne, Kessler, Goldstein & Fox P.L.L.C.

[57] ABSTRACT

A system and method for enabling a multiprocessor system employing a memory hierarchy to identify data units or locations being used as software locks. The memory hierarchy comprises a main memory having a plurality of data units, a plurality of caches that operate independently of each other, and at least one coherent domain interfaced to each cache. Each coherent domain comprises at least two processors. The main memory maintains coherency of data among the plurality of caches using a directory that maintains information about each data line. The system of the present invention allows a requesting agent, such as a processor or cache, to request a data unit without specifying the type of ownership, where ownership may be exclusive or shared. The directory includes history information that defines the previous access pattern of the requested data unit. Prior to forwarding the requested data unit to the requesting agent, the main memory checks, using a conditional fetch command, the history information to determine what type of ownership to associate with the requested data unit. The requested data unit is then delivered to the requesting agent with ownership rights specified by the history information. The processors may utilize a directory-based protocol such as MESI (modified, exclusive, shared, invalid) to maintain coherence among the processors, with each processor snooping a shared bus to track the status of caches lines in the other processors.

6 Claims, 10 Drawing Sheets

U.S. PATENT DOCUMENTS

| | | | |
|---|---|---|---|
| 4,488,217 | 12/1984 | Binder et al. | 364/200 |
| 4,562,536 | 12/1985 | Keeley et al. | 364/200 |
| 4,564,903 | 1/1986 | Guyette et al. | 364/300 |
| 4,586,133 | 4/1986 | Steckler | 364/200 |
| 4,667,288 | 5/1987 | Keeley et al. | 364/200 |
| 4,686,621 | 8/1987 | Keeley et al. | 364/200 |
| 4,843,541 | 6/1989 | Bean et al. | 364/200 |
| 4,875,155 | 10/1989 | Iskiyan et al. | 364/200 |
| 4,929,940 | 5/1990 | Franaszek et al. | 340/825.02 |
| 4,967,414 | 10/1990 | Lusch et al. | 371/51.1 |
| 5,016,167 | 5/1991 | Nguyen et al. | 364/200 |
| 5,047,920 | 9/1991 | Funabashi | 364/200 |
| 5,055,999 | 10/1991 | Frank et al. | 711/163 |
| 5,060,136 | 10/1991 | Furney et al. | 364/200 |
| 5,067,071 | 11/1991 | Schanin et al. | 395/275 |
| 5,142,676 | 8/1992 | Fried et al. | 395/425 |
| 5,237,670 | 8/1993 | Wakerly | 710/100 |
| 5,251,308 | 10/1993 | Frank et al. | 395/425 |
| 5,257,361 | 10/1993 | Doi et al. | 395/425 |
| 5,265,232 | 11/1993 | Gannon et al. | 711/124 |
| 5,276,884 | 1/1994 | Mohan et al. | 395/700 |
| 5,297,269 | 3/1994 | Donaldson et al. | 711/145 |
| 5,327,538 | 7/1994 | Hamaguchi et al. | 710/107 |
| 5,392,416 | 2/1995 | Doi et al. | 395/425 |
| 5,408,629 | 4/1995 | Tsuchiva et al. | 395/425 |
| 5,465,336 | 11/1995 | Imai et al. | 395/375 |
| 5,490,280 | 2/1996 | Gupta et al. | 395/800 |
| 5,497,472 | 3/1996 | Yamamoto et al. | 395/427 |
| 5,499,354 | 3/1996 | Aschoff et al. | 395/456 |
| 5,504,874 | 4/1996 | Galles et al. | 395/472 |
| 5,537,569 | 7/1996 | Masubuchi | 711/121 |
| 5,559,970 | 9/1996 | Sharma | 710/132 |
| 5,568,633 | 10/1996 | Boudou et al. | 711/141 |
| 5,581,725 | 12/1996 | Nakayama | 711/122 |
| 5,671,391 | 9/1997 | Knotts | 711/143 |
| 5,687,013 | 11/1997 | Henmi | 359/117 |
| 5,717,897 | 2/1998 | McCrory | 395/468 |
| 5,717,942 | 2/1998 | Haupt et al. | 395/800 |
| 5,734,922 | 3/1998 | Hagersten et al. | 712/37 |
| 5,809,536 | 9/1998 | Young et al. | 711/144 |
| 5,848,434 | 12/1998 | Young et al. | 711/144 |
| 5,909,697 | 6/1999 | Hayes et al. | 711/144 |

OTHER PUBLICATIONS

M.S. Yousif, et al., "Cache Coherence in Multiprocessor: A Survey," Advances in Computers, vol. 10, 1995, pp. 127–179.

IBM Technical Disclosure Bulletin, "Compact Global Table for Management of Multiple Caches," vol. 32, No. 7, Dec. 1, 1989, pp. 322–324.

"Exemplar System Architecture" from http://www.hp/com/wsg/products/servers/exemplar/sx–class/exemplar.htm, Downloaded Feb. 12, 1998 (Date of publication unknown).

Stenstrom et al., "Trends in Shared Memory Multiprocessing", Computer, Dec. 1977, pp. 44–50.

COMPUTER SYSTEM INCLUDING PLURAL CACHES AND UTILIZING ACCESS HISTORY OR PATTERNS TO DETERMINE DATA OWNERSHIP FOR EFFICIENT HANDLING OF SOFTWARE LOCKS

CROSS-REFERENCE TO OTHER APPLICATIONS

The following applications have a common assignee and contain some common disclosure:

"A Directory-Based Cache Coherency System," application Ser. No. 08/965,004, filed Nov. 5, 1997 and, filed herewith and incorporated herein by reference in its entirety;

"Split Lock Operation to Provide Exclusive Access to Memory During Non-Atomic Operations," application Ser. No. 08/964,623, filed Nov. 5, 1997 and, filed herewith and incorporated herein by reference in its entirety;

"Message Flow Protocol for Avoiding Deadlocks," application Ser. No. 08/964,606, filed Nov. 5, 1997 and, filed herewith and incorporated herein by reference in its entirety; and "System and Method for Providing Speculative Arbitration for Transferring Data," application Ser. No. 08/964,630, filed Nov. 5, 1997 and, filed herewith and incorporated herein by reference in its entirety.

BACKGROUND OF THE INVENTION

1. Field of the Invention

The present invention relates generally to shared memory multiprocessor systems, and more particularly to a memory optimization state for requesting data utilized by software locks.

2. Related Art

In many multiprocessor systems, all of the processors access a common memory, referred to as main memory. Typically, main memory is not capable of supplying data and instructions to multiple processors at adequate speeds. To compensate for the speed deficiencies of main memory, caches are usually incorporated. Caches are small high-speed memories, located between main memory and the processor, that are continuously updated to contain recently accessed contents of main memory. A cache copy of the contents of main memory can be accessed at a much higher speed than from main memory.

In multiprocessor systems, caches are usually attached to each processor. Thus, copies of a data unit from main memory can be stored on multiple caches at any given time. The modification of such shared data by any given processor can lead to data inconsistencies. Such inconsistencies result in cache coherence problems. Solutions to cache coherence problems must ensure that only one device has write access to a particular data unit at any given time while multiple devices may have read access to shared data. In other words, coherency requires that a read of a data unit return the value of that data unit most recently written, and a write of a data unit invalidate all copies of that data unit possessed by all other devices having read access.

In multiprocessor systems, data can either be shared among many devices or held exclusively by one device. When data is shared among many devices, each device is given read access to the data. When data is held exclusively by one device, that device is allowed, but not required, to modify the data.

Cache coherence protocols are used to maintain data consistency in multiprocessor systems with private caches. One such cache coherence protocol is the MESI (Modified Exclusive Shared Invalid) protocol. Single bus multiprocessor systems using a MESI protocol allow the devices on the bus the ability to snoop the bus to observe all data requests on the bus. In a MESI protocol a cache will snoop the request bus to ascertain the status of a data unit that it is requesting. If it is determined that no other device, with the exception of main memory, is currently holding a copy of that data unit, then the cache can obtain that data unit in the exclusive state, and thus write to that data unit without having to go back to the bus to acquire ownership or exclusive rights.

In a multiprocessor system comprising a hierarchy of buses, the ability to snoop the bus to determine the status of a data unit on all devices in the system no longer exists. When a processor requests read access to a data unit, the system must now decide whether to give the data to the processor in a shared state or in an exclusive state. In conventional systems, the general technique used is to provide the data in the shared state, and if the processor later desires write access to the data, the processor must go back to the bus and request that the data be given in the exclusive state. The system will then obtain exclusive rights and grant those rights to that processor.

This pattern of fetching the data in the shared state to read it and then later returning to the bus to request the same data in the exclusive state in order to write it, is a typical access pattern for a location of data being used as a software lock. A software lock is a software mechanism used to prevent a unit of data used by a software structure or process from having conflicting operations simultaneously being performed on that same unit of data by some other process in the system. The software structure will first read the data in the shared state or snoop the lock. If the software observes that the data unit is already locked, the software structure will not try to obtain write access to it, and possibly may go off and do other things. On the other hand, if the software snoops at the data and observes that the data unit is not locked, it will obtain exclusive rights and attempt to lock the data for its exclusive use.

This method of having to first observe if a data unit is locked and then attempt to retrieve the data unit in the exclusive state in order to lock the data unit for software operations can prevent efficient performance of software operations. What is needed is a system and method for optimizing data requests for data units being utilized as software locks.

SUMMARY OF THE INVENTION

Briefly stated, the present invention is directed to a system and method for enabling a multiprocessor system employing a memory hierarchy to provide data ownership based upon previous access patterns of a data unit. The memory hierarchy comprises a main memory having a plurality of data units, a plurality of caches that operate independently of each other, and at least one coherent domain interfaced to each cache. In a preferred embodiment, each coherent domain comprises at least two processors. The main memory includes a directory for maintaining information about each data unit. The main memory maintains coherency of data among the plurality of caches using a directory-based protocol. The present invention allows a requesting agent, such as a processor or cache, to request a data unit without specifying the type of ownership, where ownership may be exclusive or shared. The directory includes history information that defines the previous access pattern of the requested data unit, whereby main memory checks, prior to forwarding the requested data unit to the requesting agent, the history information to determine what type of ownership to associate with the requested data unit. The requested data unit is then delivered to the requesting agent with ownership rights specified by the history information.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

The preferred embodiment of the present invention is discussed in detail below. While specific configurations are discussed, it should be understood that this is done for illustration purposes only. A person skilled in the relevant art will recognize that other components and configurations may be used without parting from the spirit and scope of the invention.

Overview of the Invention

The present invention is directed to a system and method for enabling a multiprocessor system employing a memory hierarchy to identify data units or locations being used as software locks and enable the system to grant exclusive ownership to those locations when initially accessed by a requesting agent, such as a processor or cache. The system according to the present invention provides data ownership based upon previous access patterns of a data unit. When data is requested using a conditional fetch instruction, history information defining the previous access pattern of the requested data unit is examined. If the history information reflects the access pattern of a software lock, the data unit defined as being in a memory optimization state and the data unit is granted with exclusive ownership status. Otherwise, a shared copy of the data unit is granted.

Implementation of the Invention

Figure 1:
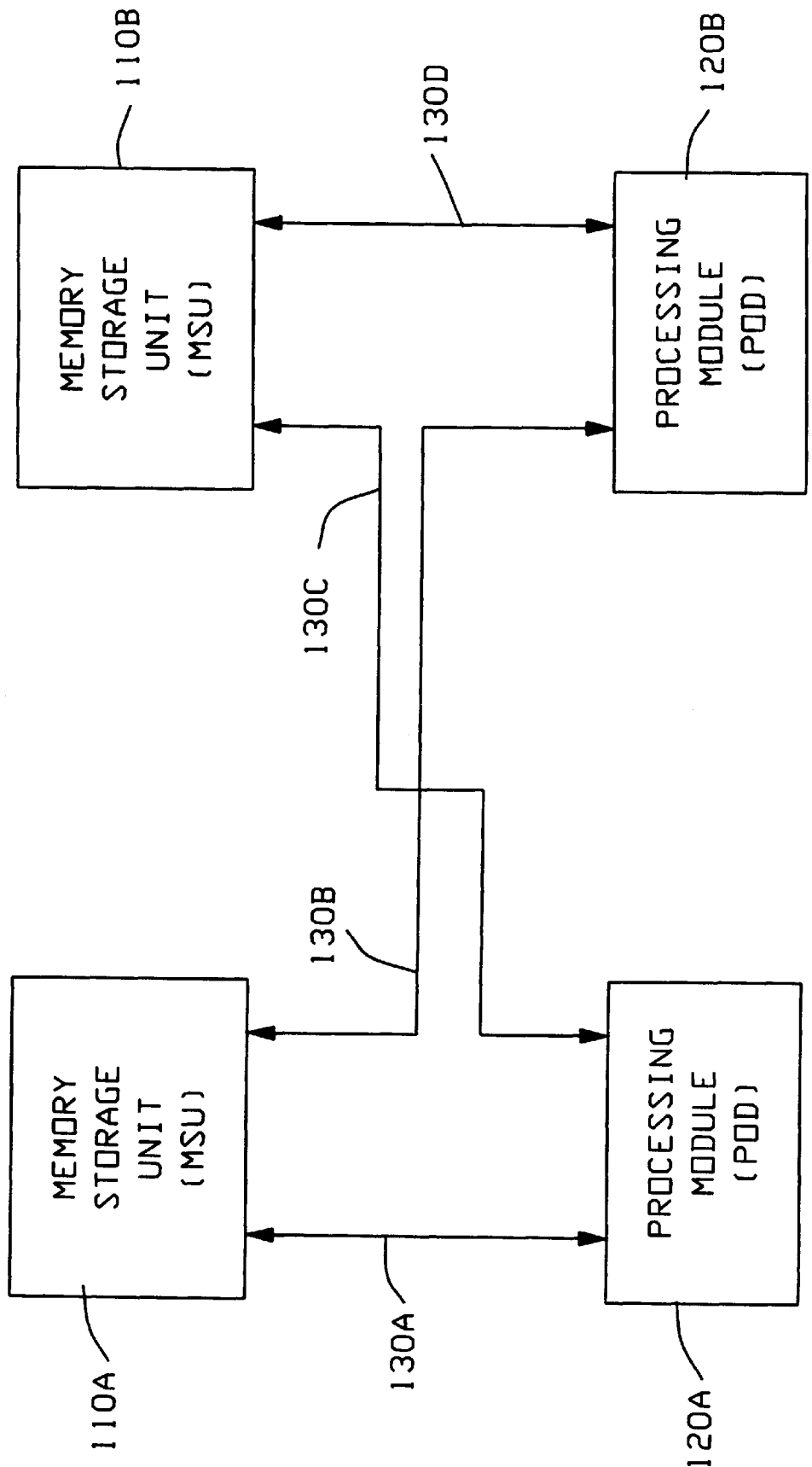
FIG. 1 is a block diagram of a system platform environment according to a preferred embodiment of the present invention.

Prior to describing the invention in detail, a description of an example system processing platform is provided. FIG. 1 is a block diagram of a system processing platform 100 in which the present invention is used. System processing platform 100 is useful for managing data flow among multiple processing systems and multiple memory storage systems. System processing platform 100 comprises one or more memory storage units (MSU) 110 (shown as MSU 110A and MSU 110B) and one or more processing modules (POD) 120 (shown as POD 120A and POD 120B). Customers can grow their system processing platform 100 by adding additional MSUs 110 and PODs 120.

Each MSU 110 is connected to each POD 120 via a MSU interface (MI) bus 130 (shown as MI bus 130A, 130B, 130C, and 130D). MI bus 130 is a point-to-point interface that has separate address/function and data buses. MI bus 130 is comprised of a uni-directional control bus, a bi-directional request bus, and a bi-directional data bus. The request bus runs at system clock frequency (SYSCLK) while the data bus runs source synchronous at two times the system clock frequency. In a preferred embodiment, in system processing platform 100, the system clock frequency is 100 megahertz (MHZ).

POD 120 has direct access to data in any MSU 110 via one of MI busses 130. For example, MI bus 130A allows POD 120A direct access to MSU 110A and MI bus 130C allows POD 120A direct access to MSU 110B.

Figure 2:
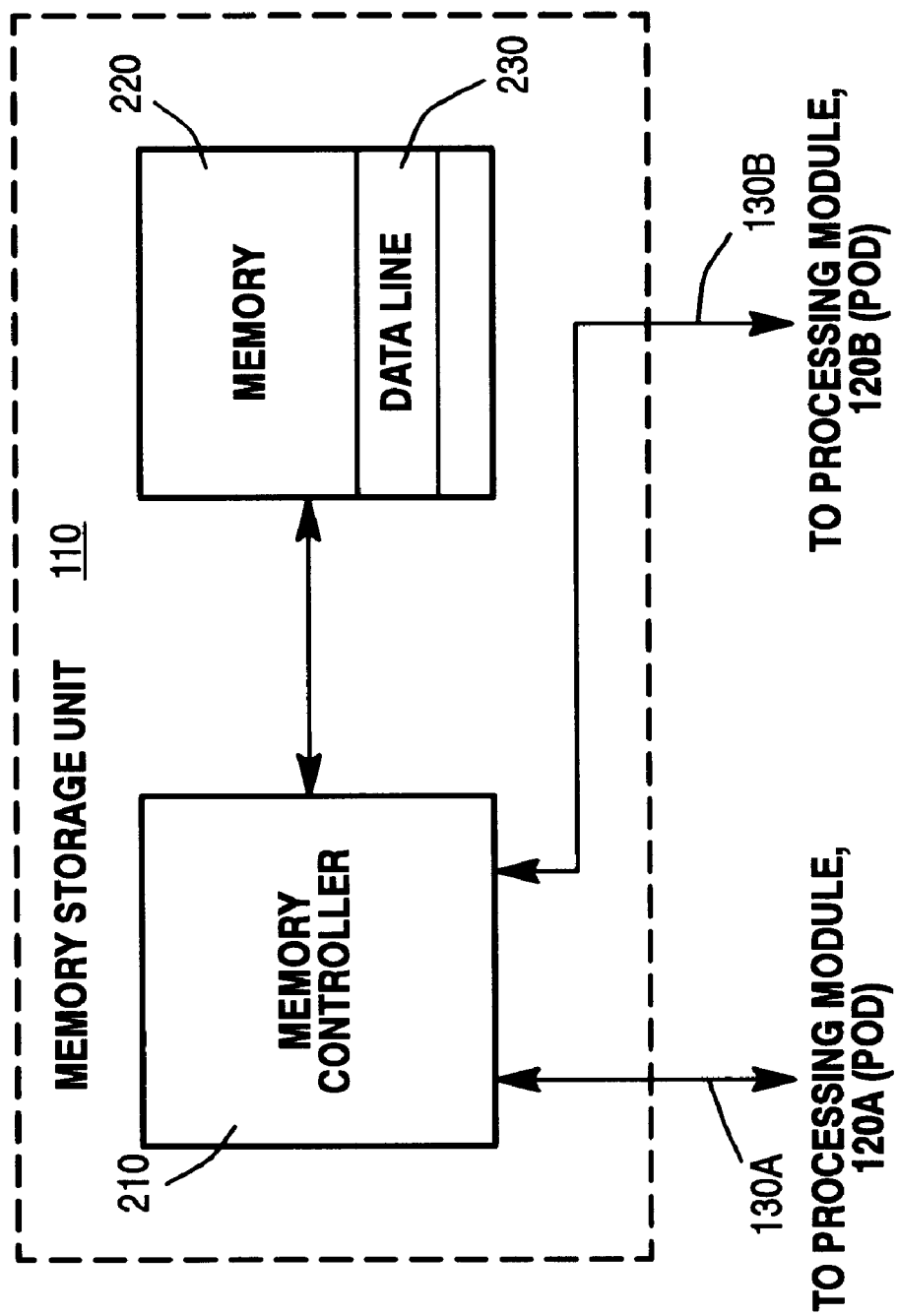
FIG. 2 illustrates an embodiment of a memory storage unit.

FIG. 2 illustrates memory storage unit (MSU) 110 in further detail. MSU 110 includes a memory controller 210 and a memory 220. Memory 220 comprises a plurality of data lines 230. Each data line 230 includes one or more addressable data storage locations for storing data and associated directory information that maintains the ownership status of the data line. Data line 230 is the smallest quantum of data transferred among MSUs 110 and PODs 120 in system platform 100. In system processing platform 100, data line 230 is equivalent to 64 bytes of information.

Memory controller 210 operates as the memory manager of memory 220. Memory controller 210 receives the control and address lines via MI bus 130 from POD 120. Memory controller 210 controls and monitors the status of each data line 230 in a manner discussed in detail below.

Figure 3:
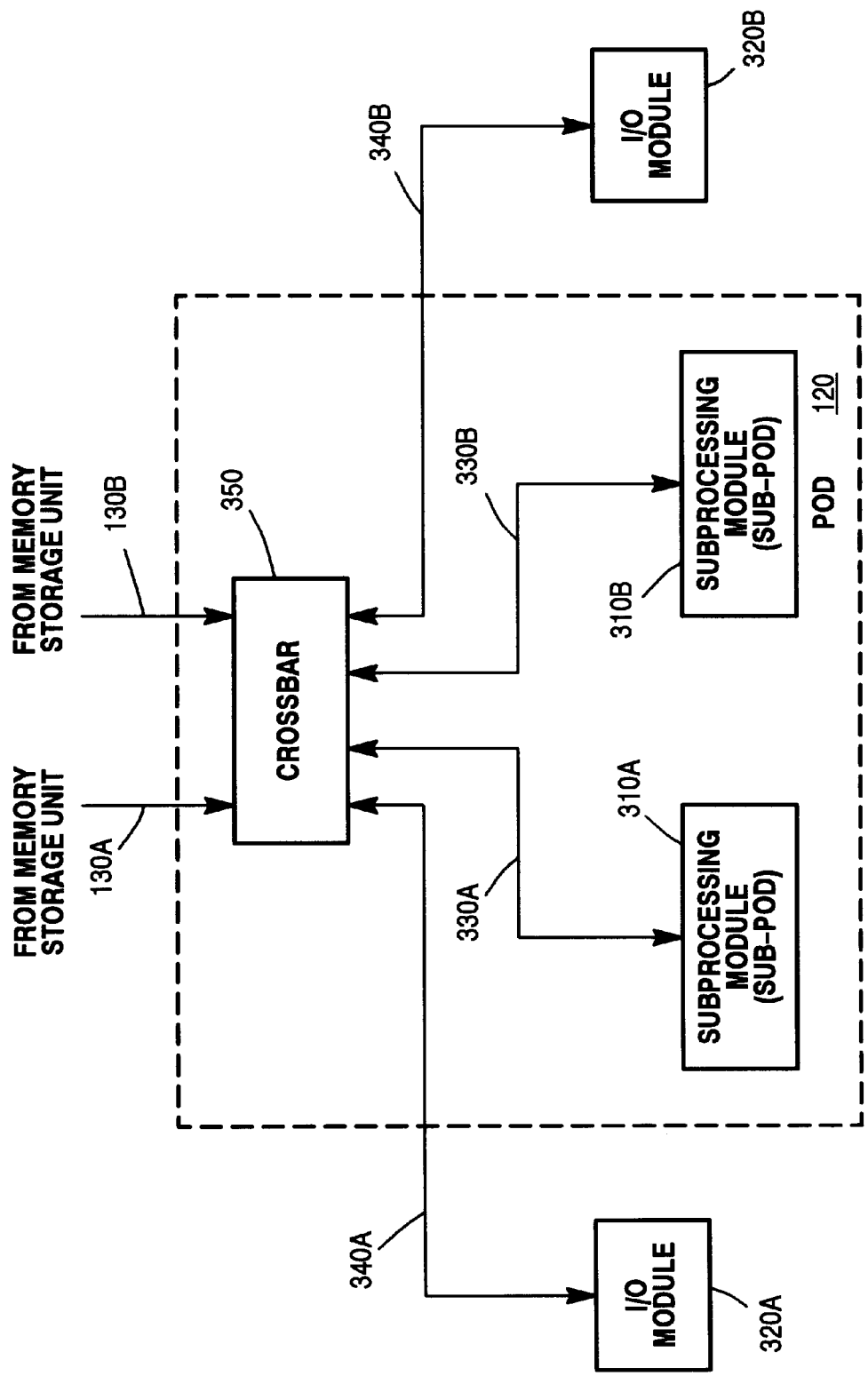
FIG. 3 illustrates an embodiment of a processing module.

A detailed block diagram of POD 120 is shown in FIG. 3. POD 120 comprises a crossbar 350, one or more sub-processing modules (sub-POD) (shown as sub-POD 310A and sub-POD 310B), and one or more input/output (I/O) modules 320 (shown as I/O module 320A and I/O module 320B). In system processing platform 100, each POD 120 contains two sub-PODs 310 and two I/O modules 320.

Crossbar 350 connects sub-POD 310 and I/O module 320 to MSU 110 via MI bus 130. Sub-POD 310 (shown as sub-POD 310A and sub-POD 310B) is connected to crossbar 350 via interface 330 (shown as interface 330A and interface 330B). Crossbar 350 interfaces I/O module 320 (shown as I/O module 320A and I/O module 320B) via interface 340 (shown as interface 340A and interface 340B). In system processing platform 100, MI bus 130 and interface 330 transfer data at equivalent transfer rates. Interface 340, between I/O module 320 and crossbar 350, has a similar configuration to MI bus 130 and interface 330, but operates at half the transfer rate.

Figure 4:
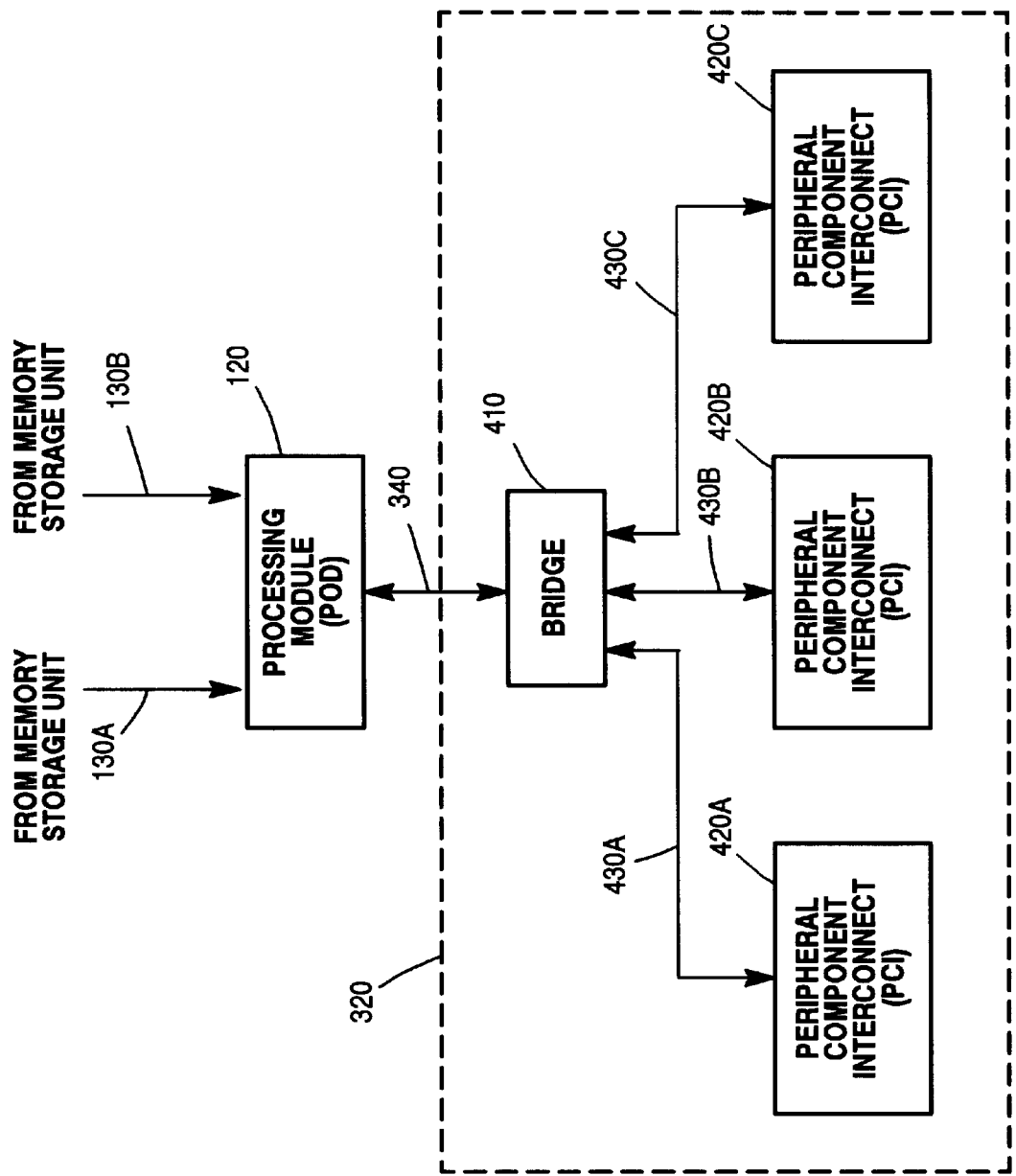
FIG. 4 illustrates an embodiment of an I/O module.

I/O module 320 is shown in FIG. 4. I/O module 320 functions as an interface between POD 120 and one or more I/O devices (not shown) connected to I/O module 320. I/O module 320 comprises a bridge 410 that interconnects one or more peripheral component interconnects (PCI) (shown as PCI 420A, PCI 420B, and PCI 420C) via bus 430 (shown as bus 430A, bus 430B, and bus 430C). Bridge 410 is also connected to crossbar 350 in POD 120 via bus 340 as shown in FIG. 3. Bridge 410 functions as a switch between bus 340 and bus 430 that allows POD 120 access to each PCI 420.

Peripheral component interconnect (PCI) 420 is an I/O bus that connects various I/O devices (not shown) to I/O module 320. In system processing platform 100, each PCI 420 can support up to four devices. These devices include, but are not limited to, monitors, keyboards, printers, disk or tape drives, etc.

Figure 5:
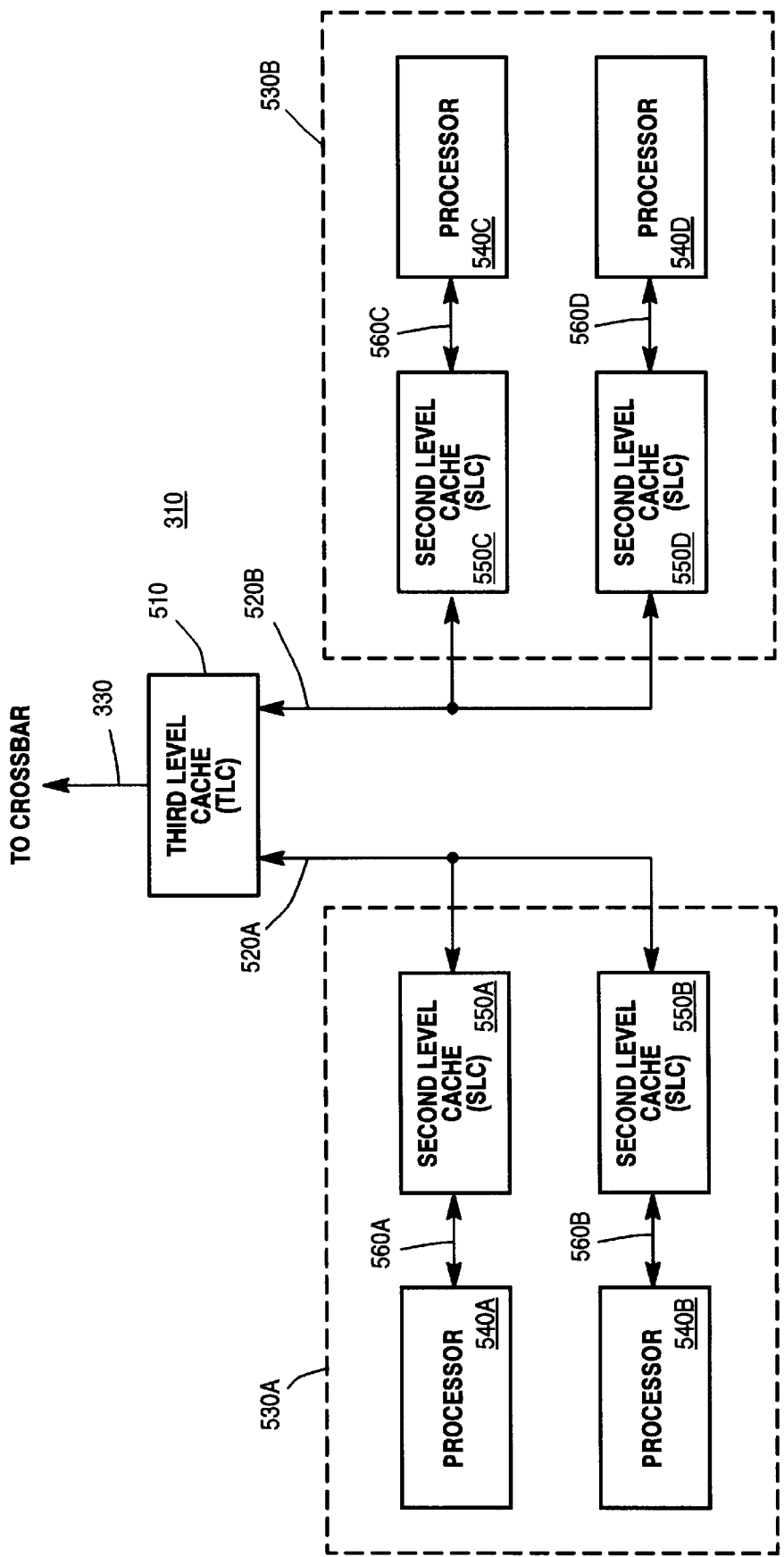
FIG. 5 illustrates an embodiment of a sub-processing module.

A block diagram of sub-POD 310 is shown in FIG. 5. Sub-POD 310 comprises a third level cache (TLC) 510 and one or more coherent domains 530 (shown as coherent domain 530A and coherent domain 530B). TLC 510 is connected to each coherent domain 530 via bus 520 (shown as bus 520A and bus 520B). TLC 510 is non-inclusive and need not include each of the cache lines included in other level caches. TLC 510 maintains coherency among each coherent domain 530. Each coherent domain 530 comprises two or more second-level caches (SLC) 550 (shown as SLC 550A and SLC 550B in coherent domain 530A and as SLC 550C and SLC 550D in coherent domain 530B) and a processor 540 connected to each SLC 550 (shown as processor 540A and processor 540B in coherent domain 530A and as processor 540C and processor 540D in coherent domain 530B) via bus 560 (shown as bus 560A and bus 560B in coherent domain 530A and as bus 560C and bus 560D in coherent domain 530B). In a preferred embodiment, each bus interface 520 supports up to two processor/SLC (540/550) configurations in a coherent domain 530. Processor module 540 can contain, for example, one of a DESHUTES style P6, a MERCED style P7, a VOYAGER style 2200, or a CAPRICORN style A series instruction processor. All four types of instruction processors are well known to person(s) skilled in the relevant art(s). SLCs 550 in each coherent domain 530 maintain coherence among themselves as well as within their own coherent domain. This is accomplished by sharing bus 520 and following a snoopy-based coherence. According to a snoopy-based coherence, each SLC 550 "snoops" request bus 520 to ascertain the status of data line 230, and to update the status of a data line stored therein, if necessary. A more detailed discussion of the snoopy protocol is contained in copending application entitled, "A Directory-Based Cache Coherency System," filed concurrently herewith (application Ser. No. 08/965,004) the entirety of which is incorporated herein by reference.

Figure 6:
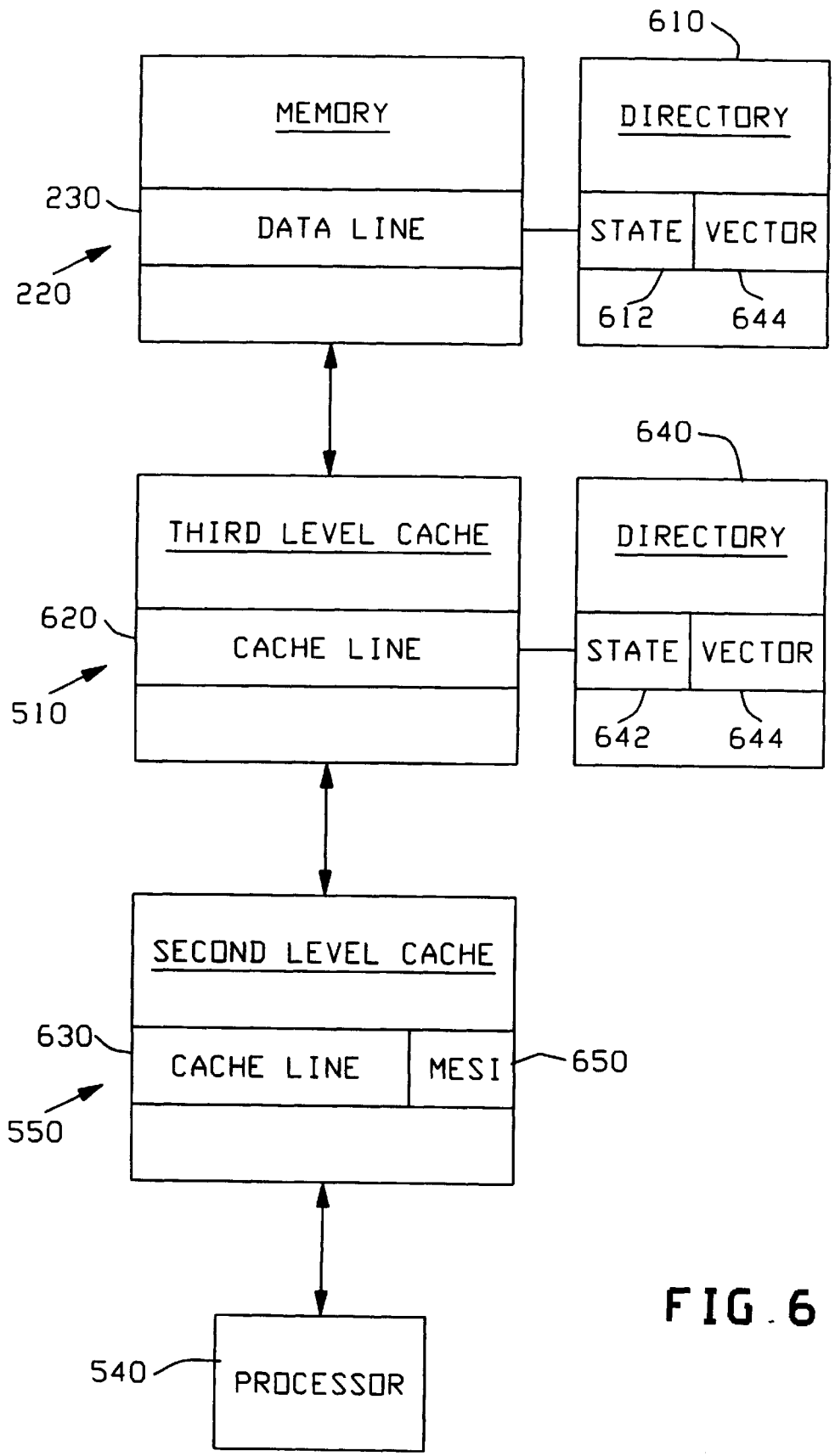
FIG. 6 illustrates an embodiment of a directory-based memory and cache system.

PODs 120 and MSUs 110 cooperate to produce a coherent memory system. The coherency scheme of system processing platform 100 is a directory-based, ownership protocol. FIG. 6 illustrates the directory-based ownership protocol used in system processing platform 100. Memory 220 and each level of cache (i.e., TLC 510, SLC 550, etc.) allow for a directory protocol for maintaining coherence. As shown in FIG. 6, memory 220 has a memory directory 610, TLC 510 has a TLC directory 640, and SLC 550 has an SLC directory 650, entitled MESI (Modified Exclusive Shared Invalid).

In a preferred embodiment, each cache 510 and 550 includes a memory for storing a data line, referred to as a cache line (shown as cache line 620 in TLC 510 and as cache line 630 in SLC 550). A cache line is a copy of the data line that exists in one or more caches 510, 550.

In directory 610, information about each data line 230 is monitored and updated using a state 612 and a vector 614. State 612 maintains information concerning the status of access granted to a requester with respect to data line 230. Such status may include present, shared, and exclusive. Present status indicates that data line 230 only exists in memory 220. Shared status indicates that a read only copy of data line 230 exists in one or more PODs 120. This indicates that these one or more PODs 120 may freely read a copy of data line 230. Exclusive status indicates that only a single requester has been granted write access to data line 230. This indicates that a single requestor has the right to modify data line 230. Vector 614 is a pointer to a sub-POD 310, who has been granted write access, when the memory state 612 indicates an exclusive status. Vector 614 is a mask, whose bits indicate which sub-PODs 310 have a read only copy, when memory state 612 indicates a shared status.

In TLC directory 640, information about each cache line 620 is monitored and updated using a state 642 and a vector 644. State 642 maintains three pieces of information concerning the status of cache line 620. This information includes ownership rights, data status, and bus rights. Vector 644 points to one or more SLCs 550 where cache line 620 exists.

Ownership rights may include exclusive, shared, and unknown. Exclusive rights indicate that TLC 510 has exclusive rights (i.e., write access) to cache line 620 and this exclusive right coincides with the corresponding status of data line 230 in memory 220. Shared rights indicate that memory 220 associates cache line 620 as being shared (i.e., read only access). Unknown rights indicate that ownership rights for cache line 620 are unknown.

Data status for TLC directory 640 may include no data, modified data, or clean data. No data indicates that no data is present in cache line 620 location. Modified data means that the data on cache line 620 has been modified. Modified data must be written back to memory 220. Clean data indicates that the data on cache line 620 has not been modified.

Bus rights indicate whether rights have been granted to one of bus 520A or 520B. Bus rights also include a state and vector (both state and vector are not shown). Bus rights may include states of exclusive, shared, or unknown. Exclusive rights indicate that exclusive ownership belongs to SLC 550 associated with one of bus 520A and 520B. Shared rights indicate that rights have been granted to both bus 520A and 520B. Unknown rights indicate that it is unknown as to which bus has rights.

In SLC directory 650, only the state of cache line 630 is maintained. The states may include modified, exclusive, shared, or invalid. Modified status indicates that the data on cache line 630 has been modified. Exclusive status indicates that the data on cache line 630 can be modified and that associated SLC 550 is the only device in which the data is contained. Shared status indicates that the data on cache line 630 is being shared among devices. Invalid status indicates that the copy of data line 230 found in cache line 630 in SLC 550 is no longer valid due to a write performed on data line 230 in another device.

Caching schemes were developed to reduce the time required by a processor, such as processor 540, to read data line 230 in memory 220. Caching systems, such as the one used in system processing platform 100, must maintain coherent data within each of memory 220, TLC 510, and SLC 550 to enable system processing platform 100 to perform properly and efficiently.

Coherency is a term well known in the art and governs the accessing of data in systems with multiple memory and processing devices. A coherent system requires that a read of a data line return the value of that data line most recently written, and a write of a data line invalidate all copies of that data line possessed by all agents having read access. With respect to processing system platform 100, coherency means that before POD 120 allows one of its requesters to modify cache line 620 or 630 within any of caches 510 and 550, POD 120 must obtain ownership permission (specifically, exclusive or write ownership) from MSU 110 for this data. Once exclusive ownership has been granted, POD 120 requesters are allowed to change cache line 620 without interacting with MSU 110. When POD 120 is through with cache line 620, cache line 620 is written back to MSU 110.

MSU 110 keeps track of cache line 620 state information on TLC 510 and I/O bus interface 340. MSU 110 does this by using directory structure 610. Directory 610 maintains information as to whether MSU 110, a particular TLC 510, or a particular I/O bus interface 340 owns data line 230. Directory 610 will maintain information as to which, if any, of TLCs 510 have outstanding copies of data line 230 or if a particular I/O device has a coherent copy outstanding. Directory 610 will also indicate whether a particular data line 230 contains an uncorrectable error.

The coherency scheme of system processing platform 100 allows for only one owner at a time and coherency is enforced on a cache line basis. Thus, if another TLC 510 or I/O bus interface 340 needs to have access to a modified cache line 620 or 630, it is the responsibility of MSU 110 to request the owner to return cache line 620 or 630 back to MSU 110 to route the new data to the requester. If the requester wants to modify cache line 620 or 630, the original owner will purge (invalidate) corresponding cache line 620 or 630 from its caches. Then, if it needs access to that particular cache line 620 or 630 again, it will be forced to go to MSU 110 for the latest copy. If a requester wants to read data line 230, the original owner is allowed to keep a copy of the corresponding cache line 620 or 630. In either case, the original owner has lost the privilege to modify any of the data in the corresponding cache line 620 or 630, and in order to do so, it must again request exclusive ownership rights from MSU 110.

The coherency scheme of system processing platform 100 is further described in copending application entitled, "A Directory-Based Cache Coherency System," filed concurrently herewith (application Ser. No. 08/965,004).

The present invention is described in terms of the above example environment. Description in these terms is provided for convenience only. It is not intended that the invention be limited to application in this example environment. In fact, after reading the following description, it will become apparent to person(s) skilled in the relevant art(s) how to implement the invention with other memory storage units and processing module configurations. For example, the present invention has applicability in any system that utilizes a bus hierarchy that is connected to a plurality of processors. Multiple level caching is not required to implement the present invention.

As previously stated, the present invention is a system and method for enabling a multiprocessor system employing a memory hierarchy bus architecture to identify data units or locations being used as software locks and enable the system to grant exclusive ownership to those locations when initially accessed by a requesting agent. The present invention optimizes the performance of a data fetch for a data unit being used as a software lock by flagging the occurrence of a fetch for a data unit in the shared state followed by a subsequent request for that same data unit in the exclusive state. The directory state for that data unit is then set to reflect a memory optimization state to show that the data location has a history of initially being requested as shared copy and subsequently being requested in the exclusive state. Thus, the next time this data unit is requested, the system will grant exclusive rights on the initial request for the data unit to eliminate the need to subsequently request the same data unit in the exclusive state.

The present invention operates when a fetch conditional (FC) command is executed. A fetch conditional command is used to read a copy of the data unit and conditionally give the requester either exclusive ownership rights or shared ownership rights, depending on the directory state for the requested data unit. The purpose of this command in conjunction with the directory state is to provide a prediction algorithm for whether an operand fetch should be given write permission or just read permission. By predicting correctly to give write permission on a fetch conditional command, a filtering of fetch ownership commands occurs, providing an increase in performance. If a fetch conditional command responds by granting the data unit as a copy, the directory state for that data unit is not set for memory optimization and the data unit does not reflect a history of first being fetched in the shared state and subsequently being fetched in the exclusive state. If a fetch conditional command responds by granting exclusive rights to the data unit, the directory state for that data unit reflects a memory optimization state, and the historical pattern of a request for that data unit indicates that the data unit is used as a software lock. An alternative embodiment would be the implementation of an optimization bit instead of a state.

The directory state, shown in Table 1, is comprised of nine bits. Bit [8] indicates how the data unit was accessed. If bit [8] is a "0," the requesting agent has exclusive ownership of the data unit. The remaining eight bits [7:0] comprise the status of the data unit, i.e., the state of the data unit, fetch condition response, the identification (ID) of the POD holding the data, the type of bus holding the data, etc. If bit [8] is a "1," the requesting agent received the data in the shared access state. The remaining eight bits [7:0] identify which TLCs in the system have a copy of the data. Memory optimization states are defined by the directory state when the requesting agent has exclusive ownership of the data unit, i.e., bit [8]=0, and the fetch condition response is set, i.e., bit [4]=1.

TABLE 1

| Directory Data | Number of Bits | Description |
| --- | --- | --- |
| [8] | 1 | 0=exclusive ownership |
|  |  | 1=shared ownership |
| if [8]=0 |  |  |
| [7:5] | 3 | 000=MSU owns data |
|  |  | 001=TLC Exclusive |
|  |  | 011=Deferred |
|  |  | 100=I/O Shared |
|  |  | 110=I/O Exclusive |
|  |  | 111=Error |
| [4] | 1 | Fetch Conditional Response |
| [3:2] | 2 | ID of POD holding data |
| [1] | 1 | Type of Bus Holding Data |
|  |  | 0=MIO |
|  |  | 1=MT |
| [0] | 1 | Offset of Bus Holding Data |
| if[8]=1 |  | Master Bit Copy Vector |
|  |  | 0=no copy |
|  |  | 1=copy |
| [7] | 1 | POD 3 TLC 1 |
| [6] | 1 | POD 3 TLC 0 |
| [5] | 1 | POD 2 TLC 1 |
| [4] | 1 | POD 2 TLC 0 |
| [3] | 1 | POD 1 TLC 1 |
| [2] | 1 | POD 1 TLC 0 |

TABLE 1-continued

| Directory Data | Number of Bits | Description |
| --- | --- | --- |
| [1] | 1 | POD 0 TLC 1 |
| [0] | 1 | POD 0 TLC 0 |

Processor-to-TLC data requests for system processing platform 100 are shown in Table 2. A read line (referred to as BRL) request indicates a read to the shared state, but if the requested cache line is not being shared, the cache line is obtained in the exclusive state. A read invalidate line (referred to as BRIL) request indicates a read of the requested cache line with the intent to modify the cache line. An invalidate line (referred to as BIL) request indicates that the processor already has the cache line in the shared state, but now intends to modify the cache line. A write line (referred to as BWL) request indicates a write of a modified cache line back into main memory.

TABLE 2

| Processor To TLC Requests | Code | Description |
| --- | --- | --- |
| Read Line | BRL | read to shared state if snoop hit, otherwise bring to exclusive |
| Read Invalidate Line | BRIL | read with intent to modify |
| Invalidate Line | BIL | processor already has line in shared state and intends to modify |
| Write Line | BWL | write a modified line back to memory |

Figure 7:
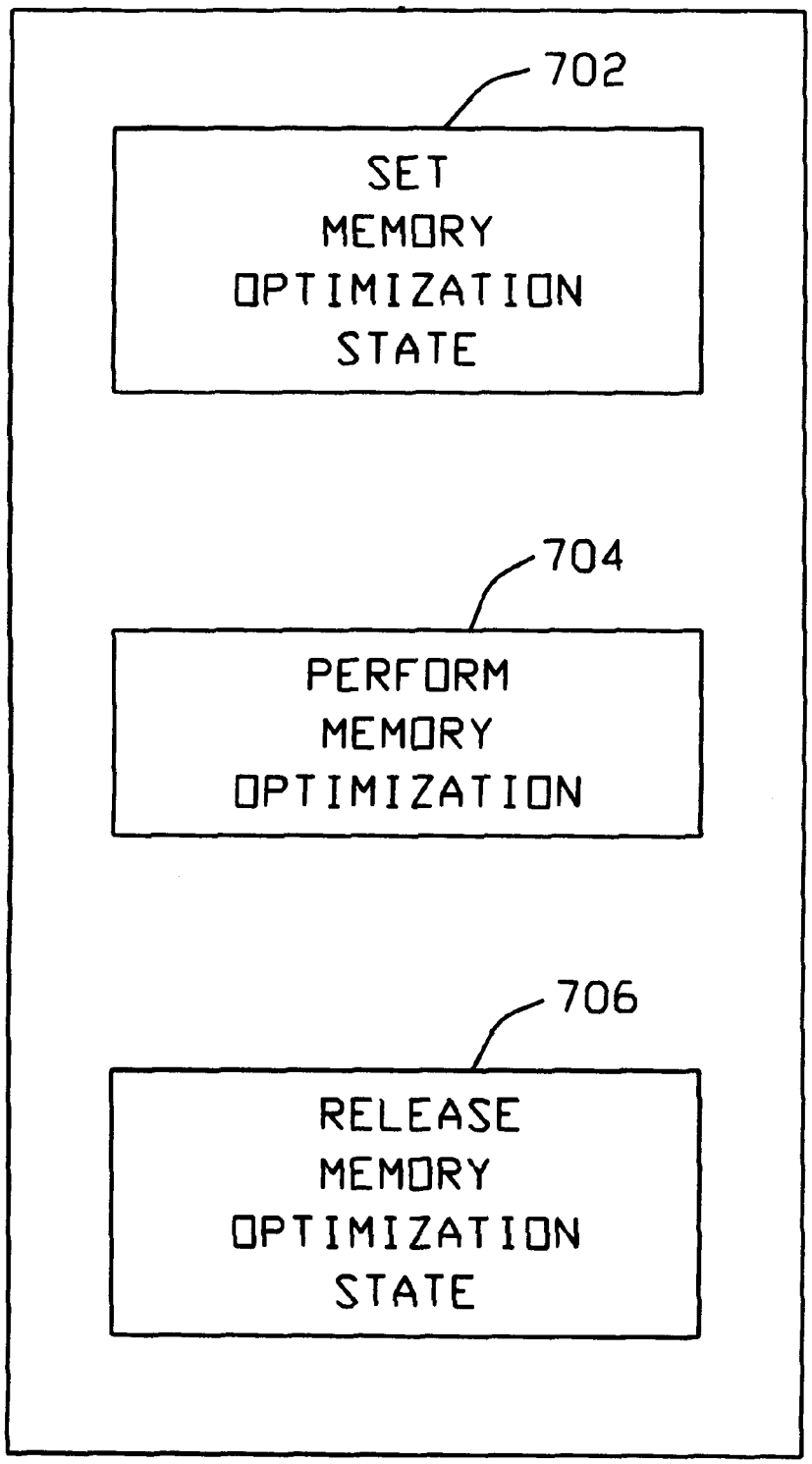
FIG. 7 illustrates a diagram representing the processes of setting, performing, and releasing the memory optimization state.

The present invention is presented in FIG. 7 as comprising three processes: the process of setting the memory optimization state 702, the process of performing memory optimization 704, and the process of releasing the memory optimization state 706. The process of setting memory optimization state 702 requires identifying data units that are accessed for use as software locks and setting the directory state for that data unit to reflect a memory optimization state. Memory optimization process 704 is triggered by the execution of a fetch conditional command. Once a fetch conditional command is executed, it is determined whether the directory state for the requested data unit is reflective of the memory optimization state. If it is, memory optimization is performed by granting exclusive rights to the data unit. If it is not, a shared copy of the data unit is granted. The behavior of a data unit fluctuates during the course of operations. A data unit flagged as being used as a software lock during a particular segment in time may eventually no longer be used for this purpose. When this occurs, the memory optimization state must be released. Process 706 identifies a data unit previously flagged as being a software lock but that is no longer functioning as a software lock, and releases the memory optimization state from the data unit's directory state.

Setting the Memory Optimization State

Figure 8:
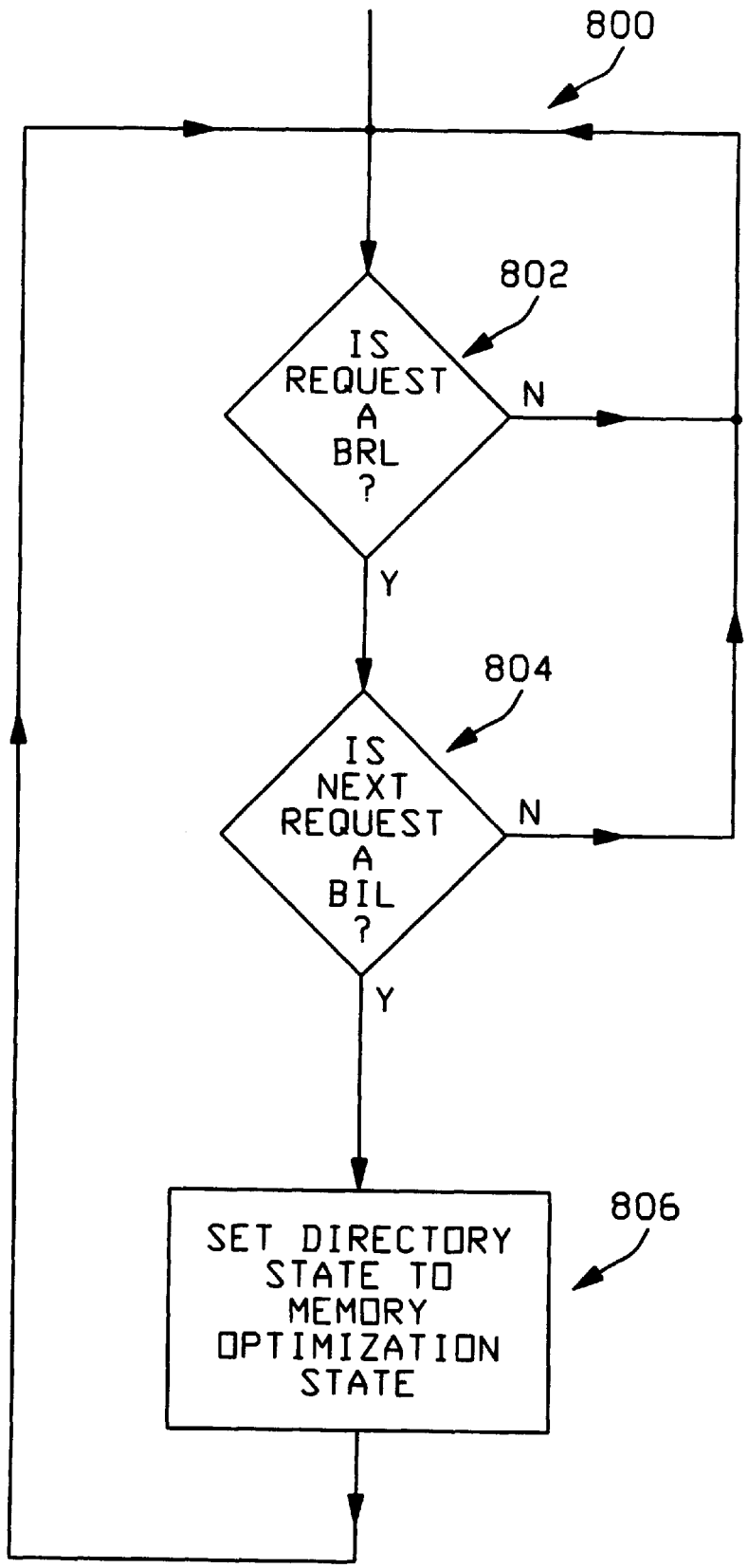
FIG. 8 is a flow diagram of the process for setting the memory optimization state.

Process 702 for setting an optimization state for a unit of data in main memory is represented by flow diagram 800 in FIG. 8. Process 702 is triggered, in decision step 802, by a request for a shared copy of a data unit, or a BRL command. If a BRL request is not made, processing remains at step 802. If a BRL request is performed, processing continues in decision step 804. In decision step 804, if the next request for the data unit granted in step 802 is a request to have that data unit in the exclusive state, or a BIL command, processing continues in step 806. Otherwise, processing returns to step 802 where the process of identifying a possible software lock starts again. In step 806, the directory state for the requested data unit is set to the memory optimization state.

Optimization Process

Figure 9:
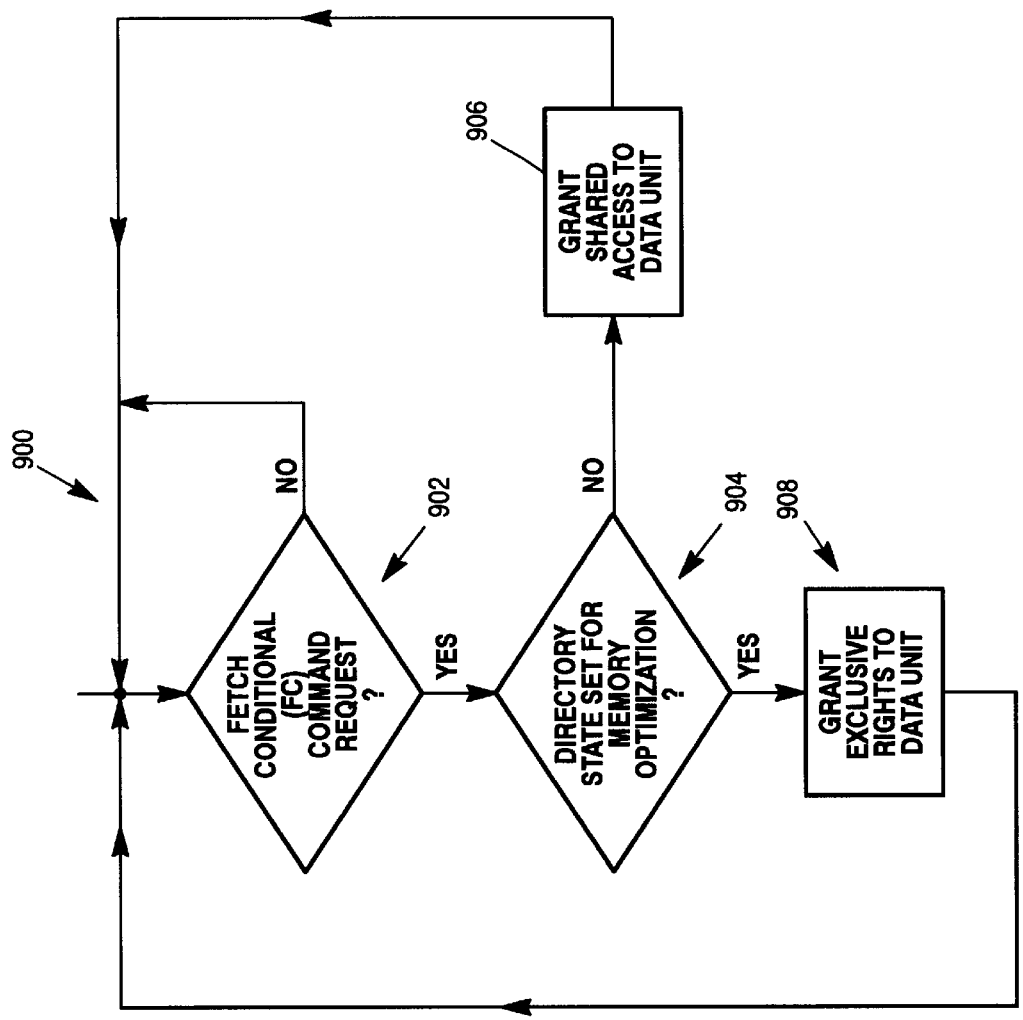
FIG. 9 is a flow diagram representing the memory optimization process.

Optimization process 704 is represented by flow diagram 900 in FIG. 9. Optimization process 704 is triggered by a fetch conditional command request in decision step 902. Until a fetch conditional command is requested, processing remains at decision step 902. If a fetch conditional command is requested in step 902, processing continues at decision step 904. In decision step 904, it is determined whether the directory state for the requested data unit is set for memory optimization (whether the history of this data unit indicates its use as a software lock). If the directory state for the requested data unit is not set for memory optimization, processing continues at step 906. In step 906, the data unit is granted shared access or access as a copy. Processing then returns to step 902 to wait for the next fetch conditional request.

Referring back to decision step 904, if the directory state for the requested data unit is set for memory optimization, processing continues at step 908. In step 908, the data unit is granted access in the exclusive state, i.e., write access. Processing then returns to step 902 to wait for the next fetch conditional request.

Releasing the Memory Optimization State

Figure 10:
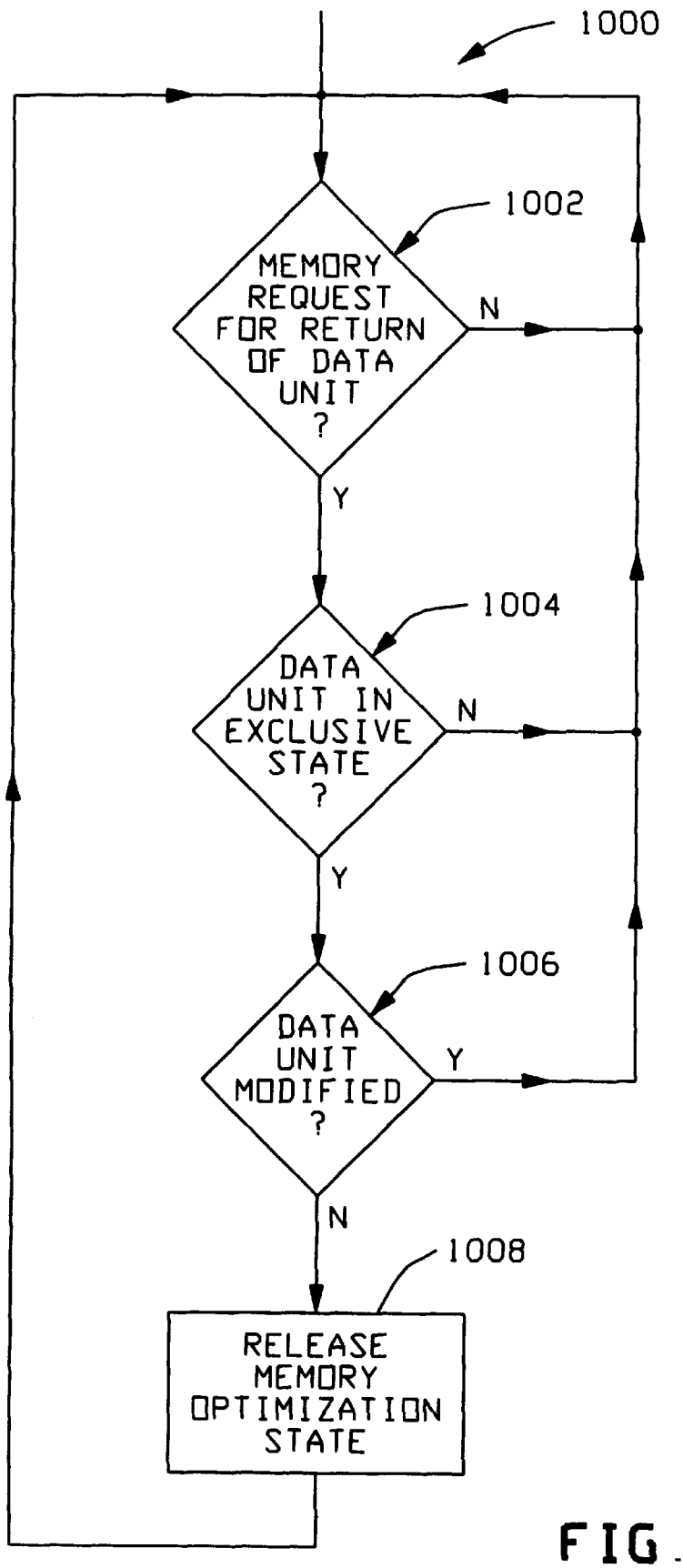
FIG. 10 is a flow diagram of the process for releasing the memory optimization state.

Process 706 for releasing the memory optimization state is represented by flow diagram 1000 in FIG. 10. Process 706 is triggered, in step 1002, by a request from memory for the return of a data unit. The request from memory to return the data unit can occur when another requesting agent (i.e., a TLC 510, an I/O Module 320, or a processor 540) needs to have access to the modified data unit. Until a request from memory to return a data unit occurs, processing remains in step 1002. If a request from memory to return a data unit occurs, processing continues at decision step 1004. In decision step 1004, it is determined whether the data unit to be returned is in the exclusive state. If the data unit is not in the exclusive state, processing returns to step 1002 to wait for the next memory request for return data. Referring back to decision step 1004, if the data unit is in the exclusive state, processing continues at decision step 1006. In decision step 1006, it is determined whether the data unit was modified. If the data unit was modified, processing returns to step 1002 to wait for the next memory request for return data. Referring back to step 1006, if the data was not modified, processing continues at step 1008. In step 1008, the memory optimization state is released or removed from the directory state for the data unit.

Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer system having a memory hierarchy, said computer system comprising:

a main memory having a plurality of data units, said main memory having a directory for maintaining information about said data units;

a plurality of caches interfaced to said main memory, each cache within said plurality of caches operating independently of each other, each of said caches having one or more cache lines, each cache line for storing data;

at least one coherent domain interfaced to each of said plurality of caches;

wherein said main memory maintains coherency of data among said plurality of caches using said directory;

wherein each of said plurality of caches maintains coherency of data stored within its associated said at least one coherent domain;

wherein said main memory includes a means for enabling a multiprocessor system employing the memory hierarchy to grant data ownership based upon previous access patterns of a data unit;

means for requesting a data unit by a requesting agent where the type of ownership is not specified, and where ownership may be one of exclusive or shared; and wherein said directory includes history information that defines the previous access patterns of said requested data unit, whereby said main memory checks, prior to forwarding said requested data unit to said requesting agent, said history information to determine what type of ownership to associate with said requested data unit.

2. The computer system of claim 1, wherein each of said plurality of caches stores said data lines.

3. The memory hierarchy of claim 1, wherein each at least one coherent domain is non-inclusive of its associated plurality of caches.

4. The memory hierarchy of claim 1, wherein said at least one coherent domain comprises at least two processors.

5. The memory hierarchy of claim 4, wherein said coherent domain includes means for maintaining processor consistency among said at least two processors.

6. The memory hierarchy of claim 5, wherein said means for maintaining processor consistency among at least two processors comprises:

means for implementing a directory-based protocol among said at least two processors.

* * * * *